United States Patent
Son et al.

(10) Patent No.: US 8,970,681 B2
(45) Date of Patent: *Mar. 3, 2015

(54) METHOD OF CONTROLLING VIEW OF STEREOSCOPIC IMAGE AND STEREOSCOPIC IMAGE DISPLAY USING THE SAME

(75) Inventors: Hyeonho Son, Gyeonggi-do (KR); Moojong Lim, Seoul (KR); Hoyoung Jung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 421 days.

This patent is subject to a terminal disclaimer.

(21) Appl. No.: 12/580,668

(22) Filed: Oct. 16, 2009

(65) Prior Publication Data

US 2010/0171697 A1     Jul. 8, 2010

(30) Foreign Application Priority Data

Jan. 7, 2009 (KR) .................. 10-2009-0001207

(51) Int. Cl.
  *G06F 3/01* (2006.01)
  *H04N 13/02* (2006.01)

(52) U.S. Cl.
  CPC ............ *G06F 3/012* (2013.01); *H04N 13/0278* (2013.01)
  USPC ................. 348/51; 345/8; 345/156; 345/158; 345/204; 345/418; 348/42; 348/53; 348/54; 348/55; 348/56; 348/57; 348/58

(58) Field of Classification Search
  CPC ..... G09G 5/00; H04N 13/04; H04N 13/0429; G02B 27/22; G06F 3/033
  USPC .................. 345/158; 348/53, 54–58
  See application file for complete search history.

(56) References Cited

U.S. PATENT DOCUMENTS

| | | | | |
|---|---|---|---|---|
| 4,649,425 A | * | 3/1987 | Pund | 348/52 |
| 5,781,229 A | * | 7/1998 | Zediker et al. | 348/51 |
| 8,537,206 B2 | * | 9/2013 | Son et al. | 348/53 |
| 2006/0146046 A1 | * | 7/2006 | Longhurst et al. | 345/418 |
| 2007/0002132 A1 | * | 1/2007 | Kim et al. | 348/57 |
| 2007/0176914 A1 | * | 8/2007 | Bae et al. | 345/204 |

(Continued)

FOREIGN PATENT DOCUMENTS

JP     2005-142957 A     6/2005

OTHER PUBLICATIONS

Orion, Storm, Head Tracking for Virtual Reality Displays, U.S. Appl. No. 61/070,516 dated Mar. 24, 2008 being cited and attached with the Office Action.*

(Continued)

*Primary Examiner* — Grant Sitta
*Assistant Examiner* — Amen Bogale
(74) *Attorney, Agent, or Firm* — Morgan, Lewis & Bockius LLP

(57) ABSTRACT

A method of controlling a view of a stereoscopic image and a stereoscopic image display using the same are disclosed. The method of controlling a view of a stereoscopic image includes: detecting a position information of a viewer from an output of a sensor; changing parameters for rendering a viewing angle and a depth information according to the position information; generating a left-eye image and a right-eye image in which a viewing angle and a depth information are changed in accordance with the parameters; and displaying the left-eye image and the right-eye image on a stereoscopic image display.

16 Claims, 10 Drawing Sheets

(56) References Cited

U.S. PATENT DOCUMENTS

| | | | |
|---|---|---|---|
| 2007/0263003 A1* | 11/2007 | Ko et al. | 345/502 |
| 2008/0123938 A1* | 5/2008 | Kim | 382/154 |
| 2008/0199049 A1* | 8/2008 | Daly | 382/107 |
| 2009/0237355 A1* | 9/2009 | Orion et al. | 345/156 |
| 2010/0007582 A1* | 1/2010 | Zalewski | 345/8 |

OTHER PUBLICATIONS

KIPO—Office Action—Korean Patent Application No. 10-2009-0001207—Issued on Feb. 25, 2013.

* cited by examiner camera capture image

IR sensor image

METHOD OF CONTROLLING VIEW OF STEREOSCOPIC IMAGE AND STEREOSCOPIC IMAGE DISPLAY USING THE SAME

This application claims the benefit of Korean Patent Application No. 10-2009-0001207 filed on Jan. 7, 2009, which is incorporated herein by reference for all purposes as it fully set forth herein.

BACKGROUND OF THE INVENTION

1. Field of the Invention

This document relates to a method of controlling a view of a stereoscopic image and a stereoscopic image display using the same.

2. Discussion of the Related Art

A stereoscopic image display may be classified into a stereoscopic technique and an autostereoscopic technique.

The stereoscopic technique is implemented using a time difference image of left and right eyes having the most reliable three dimensional effects. The stereoscopic technique is classified into a glasses method and a non-glasses method, both of which are commercialized. The glasses method displays left and right parallax images on a direct-view display or projector by changing polarization direction thereof or a time-divisional manner, and implements a stereoscopic image using polarization glasses or liquid-crystal shutter glasses. The non-glasses method is a method in which, generally, an optical plate, such as a parallax barrier, for separating the optical axes of left and right parallax images is installed in front or rear of a display screen.

In the glasses method, a display device alternately displays a left-eye image and a right-eye image and switches the polarization property of light incident on polarizing glasses. Accordingly, the glasses method can display a stereoscopic image without a deterioration of resolution by time-dividing a left-eye image and a right-eye image.

In recent years, three dimensional (3D) contents using a stereoscopic image have been being diversified into 3D games, 3D advertisements, 3D movies, and so on. In order to enlarge the applications and contents of stereoscopic images, there is a need to adaptively control a view of a stereoscopic image according to a viewer's motion.

SUMMARY OF THE INVENTION

Accordingly, the present invention has been made to solve the above-mentioned problems occurring in the prior art, and an aspect of the present invention is to provide a method of controlling a view of a stereoscopic image, which can implement an unlimited number of views of a stereoscopic image by changing a viewing angle and a depth information of a left-eye image and a right-eye image of a stereoscopic image according to a viewer's position, and a stereoscopic image display using the same.

To achieve the above aspect, there is provided a method of controlling a view of a stereoscopic image according to an exemplary embodiment of the present invention, including: detecting a position information of a viewer from an output of a sensor; changing parameters for rendering a viewing angle and a depth information according to the position information; generating a left-eye image and a right-eye image in which a viewing angle and a depth information are changed in accordance with the parameters; and displaying the left-eye image and the right-eye image on a stereoscopic image display.

There is provided a stereoscopic image display according to an exemplary embodiment of the present invention, including: a display device including a sensor; a position information detecting unit for detecting a position information of a viewer based on an output of the sensor; and an image processing unit for generating a left-eye image and a right-eye image in which a viewing angle and a depth information are changed by changing parameters for rendering a viewing angle and a depth information in accordance with the position information, and for separately displaying the left-eye and right-eye images on the stereoscopic image display.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

The above and other aspects and features of the present invention will become more apparent by describing exemplary embodiments thereof with reference to the attached drawings.

Hereinafter, implementations of this document will be described in detail with reference to FIGS. 1 to 10D.

Figure 1:
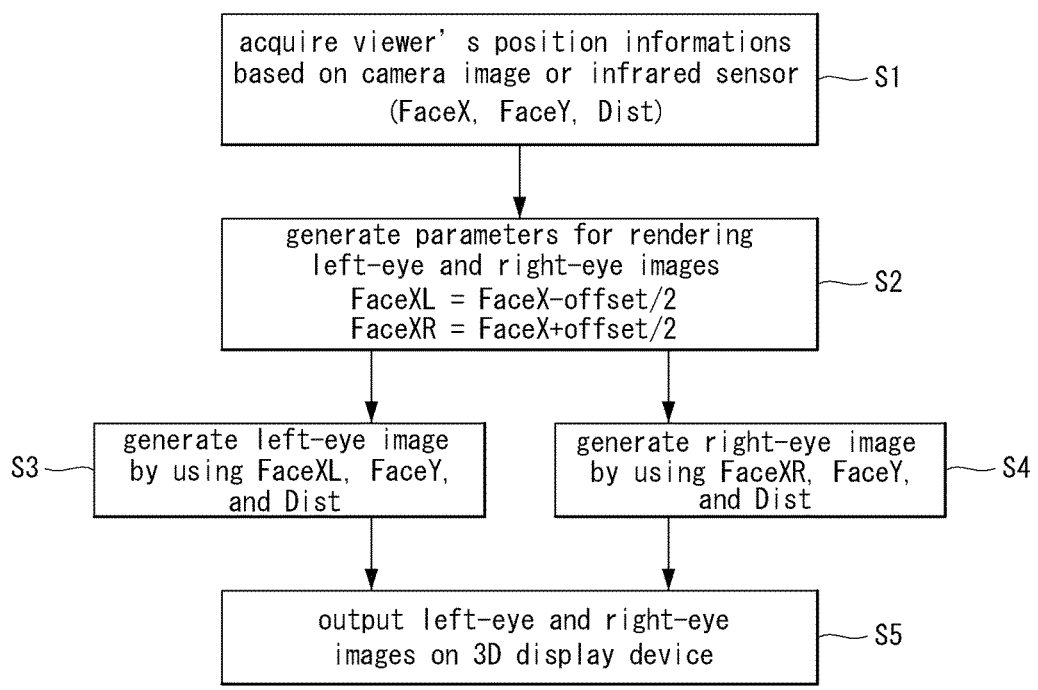
FIG. 1 is a flow chart showing step by step a control sequence of a method of controlling a view of a stereoscopic image according to an exemplary embodiment of the present invention.

Referring to FIG. 1, in a method of controlling a view of a stereoscopic image according to an exemplary embodiment of the present invention, a position information of a viewer (or observer) is acquired based on a camera image or an output of an infrared sensor (S1). The position information is a three-dimensional position information including a viewer face's X-axis position information FaceX, a viewer face's Y-axis information FaceY, and a distance (or Z-axis position information) Dist between the viewer and a stereoscopic image display.

In the method of controlling a view of a stereoscopic image according to the exemplary embodiment of the present invention, variable parameters for rendering the viewing angle and depth information of each of left and right eye images displayed on the stereoscopic image display according to the viewer's three dimensional position information are adjusted (S2). A rendering variable FaceXL of the left-eye image is "FaceXL=FaceX−offset/2", which is determined in accordance with the three-dimensional position information of the viewer's face, and a rendering variable FaceXR of the right-eye image is "FaceXR=FAceX+offset/2, which is determined in accordance with the three-dimensional position information of the viewer's face. Herein, the word "offset" represents the distance between a camera view for generating a left-eye image and a camera view for generating a right-eye image, which corresponds to the distance between the left and right eyes of the viewer. According to the viewer's three-dimensional position information, Y-axis and Z-axis-related parameters of the left-eye and right-eye images, along with an X-axis-related parameter of the left-eye and right-eye images, can be changed in real time in accordance with the Y-axis and Z-axis position information of the viewer.

In the method of controlling a view of a stereoscopic image according to the exemplary embodiment of the present invention, a left-eye image and a right-eye image are generated according to the left-eye and right-eye image rendering variables and the position information, and the left-eye image and the right-eye image are displayed on the stereoscopic image display (S3 to S5). Since the rendering variables of the left-eye and right-eye images are updated whenever the position information is changed, a view of each of the left-eye and right-eye images displayed on the stereoscopic image display is changed in real time according to the viewer's position. Accordingly, the stereoscopic image display of the present invention can generate, in real time, depth information of a stereoscopic image which varies according to the viewer's view position and provide an unlimited number of views of the stereoscopic image to the viewer.

Figure 2:
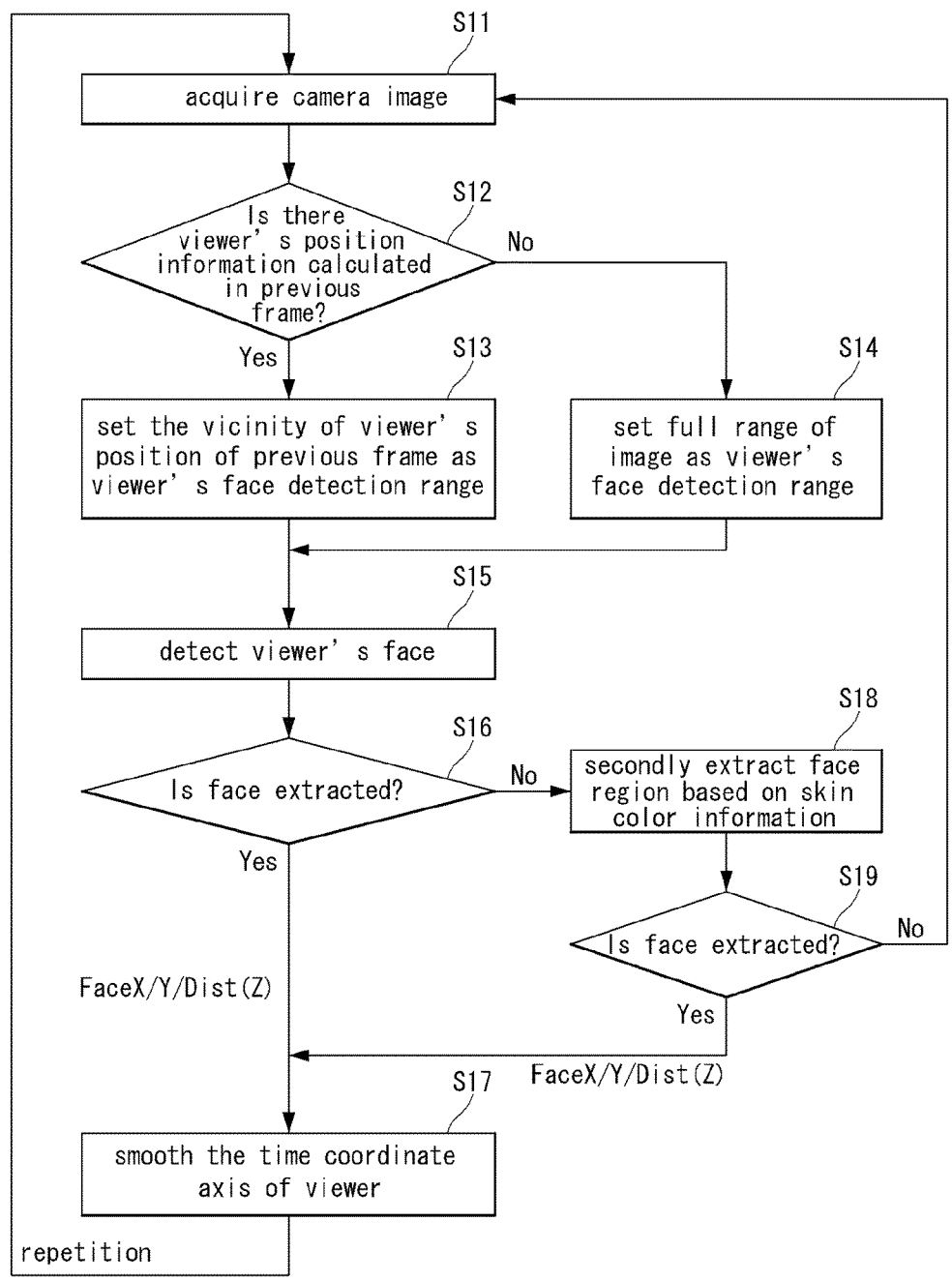
FIG. 2 is a flowchart showing step by step a control sequence of a method for acquiring a position information of a viewer based on a camera image in step S1 of FIG. 1.
Figure 3:
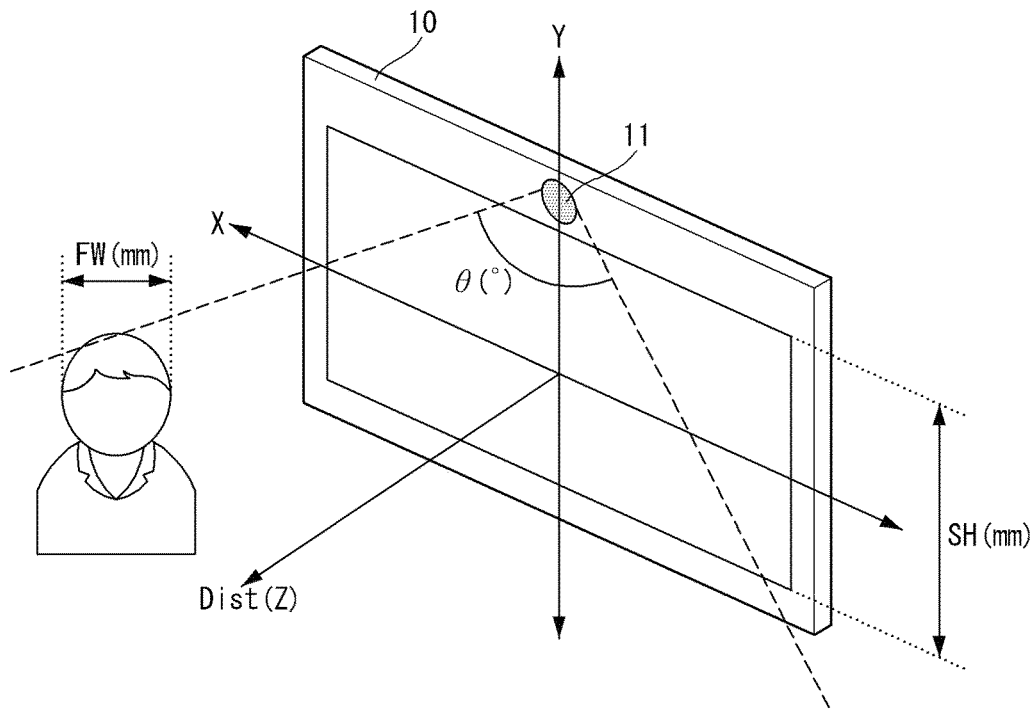
FIG. 3 is a view showing a stereoscopic image display and a three-dimensional position information for the a face of viewer viewing a stereoscopic image displayed on the stereoscopic image display.
Figure 4:
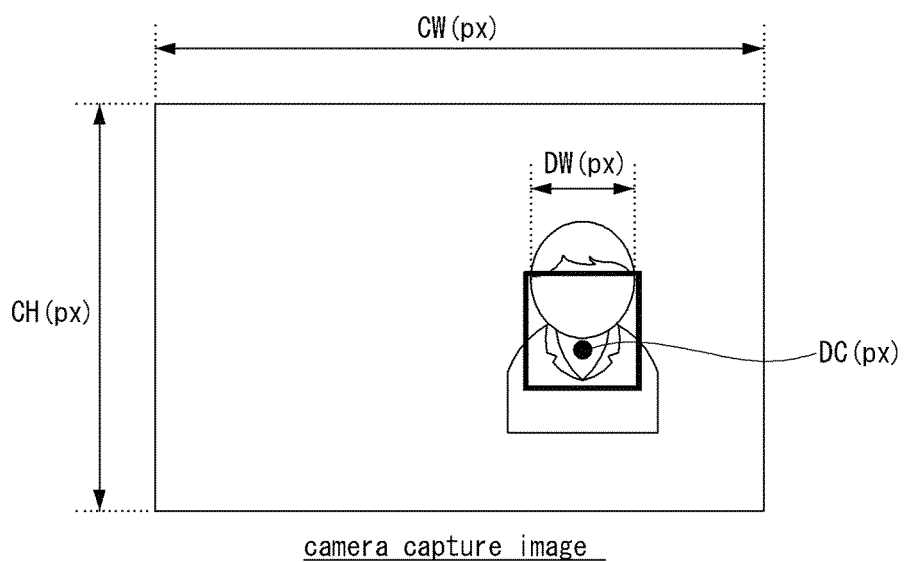
FIG. 4 is a view showing a camera capture image taken by a camera installed on the stereoscopic image display.

FIG. 2 is a flowchart showing step by step a control sequence of a method for acquiring position information of the viewer (or observer) based on the camera image in step S1 of FIG. 1. FIG. 3 is a view showing a stereoscopic image display 10 and three-dimensional position information of the viewer viewing a stereoscopic image displayed on the stereoscopic image display 10. FIG. 4 is a view showing a camera capture image taken by a camera 11 installed on the stereoscopic image display 10.

Referring to FIGS. 2 to 4, the stereoscopic image display 10 includes a display screen for displaying left-eye and right-eye images, a frame surrounding the display screen, and a camera 11 installed on the frame. When the viewer is present within a viewing angle of the camera 11, the viewer image is contained in an image taken by the camera 11. A camera capture image shown in FIG. 4 includes a CW(px)×CH(px) pixel matrix which is determined according to the resolution of the camera.

In the method of controlling a view of a stereoscopic image, a camera capture image of the current frame shown in FIG. 4 is analyzed to determine whether or not there exists viewer's position information calculated in the previous frame. In the method of controlling a view of a stereoscopic image, if viewer's position information calculated in the previous frame exists in the camera capture image of the current frame, the vicinity of the viewer's position calculated in the previous frame is set as a viewer face detection range (S11 to S13). On the other hand, in the method of controlling a view of a stereoscopic image, if viewer's position information calculated in the previous frame does not exist in the camera capture image of the current frame, the full range of the camera capture image of the current frame is set as a viewer's face detection range (S11, S12, and S14).

In the method of controlling a view of a stereoscopic image, the viewer's face is extracted as XYZ three-dimensional position information FaceX, FaceY, and Dist from the camera capture image by detecting the viewer's face by using a well-known face detection algorithm within the face detection range set in steps S13 and S14 (S15 and S16). "Face detection algorithm of Viola and Jones" may be applied as one example of the face detection algorithm, but the present invention is not limited thereto and any well-known face detection algorithm may be applied. The face detection algorithm of Viola and Jones is as in the following Equations 1 to 4. In Equations 1 to 4, parameters FW(mm), SH(mm), θ(°), CW(px), and CH(px) represent constant values which are determined by the stereoscopic image display 10, the camera 11, and the camera capture image as shown in FIGS. 3 and 4, and DW(px) and DC(px) calculated from the camera capture image represent variable values which are calculated in real time by the face detection algorithm of Viola and Jones according to the viewer's motion. FW represents the width of the viewer's face, SH represents a screen height of the stereoscopic image display 10, θ represents an angle from which the viewer views the stereoscopic image, CW represents the horizontal length of the camera capture image, CW represents the vertical height of the camera capture image, DW represents the width of the viewer's face detected from the camera capture image, and DC represents the center of the viewer's face detected from the camera capture image.

$$RPP = \frac{\pi}{360} \cdot \theta \cdot CW \quad \text{[Equation 1]}$$

Herein, RPP represents Radians per pixel, and CW represents the horizontal length of the camera capture image.

$$Dist = \frac{\left(\frac{FW}{2}\right)}{\tan\left(RPP \cdot \frac{DW}{2}\right)} \quad \text{[Equation 2]}$$

Herein, Dist represents the distance (face distance) between the stereoscopic image 10 and the viewer in FIG. 3.

$$FaceX = \sin\left(RPP\left(DC \cdot X - \frac{CW}{2}\right)\right) \cdot Dist \quad \text{[Equation 3]}$$

Herein, FaceX represents the position of the viewer's face on the X axis, and DC.X represents the x-axis pixel position of the center of the viewer's face detected from the camera capture image in FIG. 3.

$$FaceY = \sin\left(RPP\left(DC \cdot Y - \frac{CH}{2}\right)\right) \cdot Dist - \frac{SH}{2} \quad \text{[Equation 4]}$$

Herein, FaceY represents the position of the viewer's face on the Y axis, and DC.Y represents the y-axis pixel position of the center of the viewer's face detected from the camera capture image in FIG. 3.

In the method of controlling a view of a stereoscopic image, if it fails to detect the viewer's face from the camera capture image in steps S11 to S16, a region containing the largest skin color area from the camera capture image is recognized as the viewer's face, and the viewer's face is detected by performing steps S11 to S16 again and the viewer's face is extracted as XYZ three-dimensional position information FaceX, FaceY, and Dist (S17 and S18).

In the method of controlling a view of a stereoscopic image, the three-dimensional position information FaceX, FaceY, and Dist of the viewer's face viewing the stereoscopic image display 10, which is extracted by repeating steps S16 and S18 during a predetermined frame period, e.g., several tens of frame periods, is averaged (S19). This is in order to smooth position information on a time axis and determine it as final three-dimensional position information of the viewer's face because the position information may be slightly changed by any minor noise mixed in the camera capture image even when the viewer does not make any movement at all.

Figure 5:
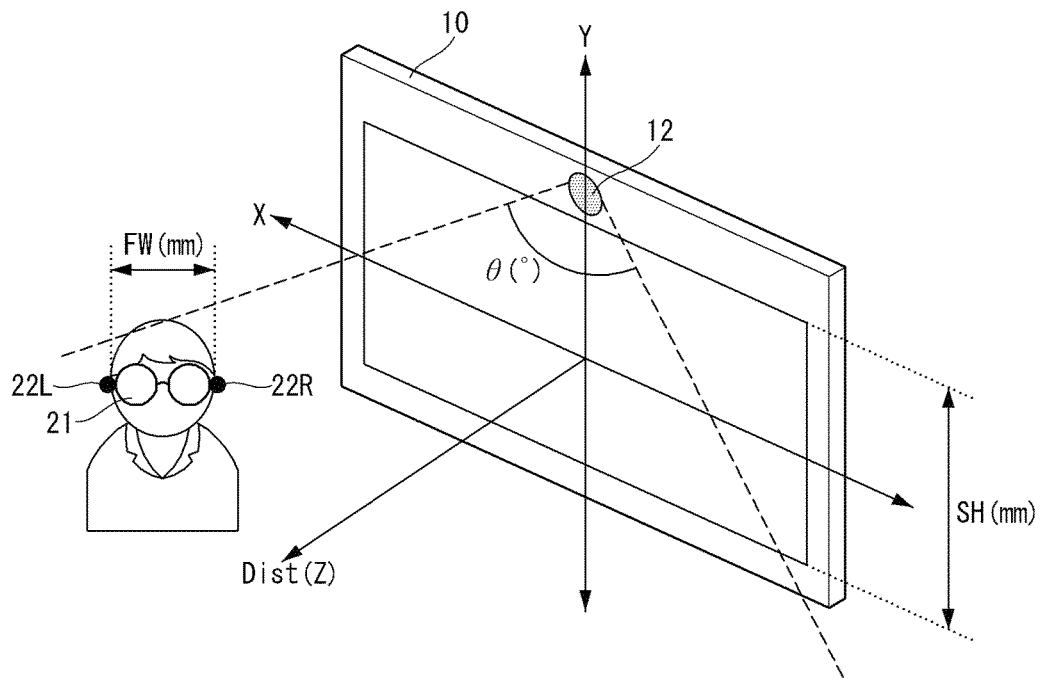
FIG. 5 is a view for explaining a method of acquiring viewer's position information based on an output of an infrared sensor in step S1 of FIG. 1, which illustrates a stereoscopic image display on which the infrared sensor is installed and three-dimensional position information of the viewer's face.
Figure 6:
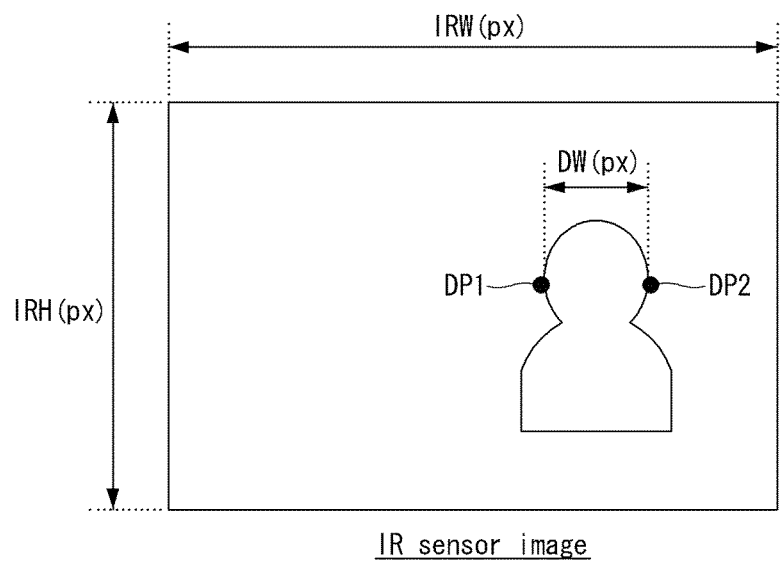
FIG. 6 is a view showing the position of an infrared light receiving pixel detected by the infrared sensor shown in FIG. 5.

FIGS. 5 and 6 are views for explaining a method of acquiring position information of a viewer (or observer)' based on an output of an infrared sensor in step S1 of FIG. 1.

Referring to FIGS. 5 and 6, the stereoscopic image display 10 includes a display screen for displaying left-eye and right-eye images, a frame surrounding the display screen, and an infrared sensor 12 installed on the frame. The viewer wears 3D polarizing glasses 21 on which left and right infrared emitting devices 22L and 22R are mounted. When the viewer wearing the 3D polarizing glasses 21 is present within a viewing angle of the infrared sensor 12, infrared light from each of the left and right infrared emitting devices 22L and 22R is received as an output of the infrared sensor 12. As shown in FIG. 6, the infrared sensor includes a IRW(px)×IRH (px) pixel matrix which is determined according to the resolution of the sensor.

In the method of controlling a view of a stereoscopic image, in step S1 of FIG. 1, infrared ray receiving positions DP1 and DP2 are detected from the output of the infrared sensor shown in FIG. 6, and the width DW of the viewer's face, the XY coordinates DC.X and DC.Y of the center point of the viewer's face, and three-dimensional position information FaceX, FaceY, and Dist of the viewer's face are calculated by the following Equations 5 to 11.

$$DW = \sqrt{(DP1.X - DP2.X)^2 + (DP1.Y - DP2.Y)^2}$$ [Equation 5]

Herein, DW represents the width between the left and right infrared ray emitting devices 22L and 22R detected from the infrared sensor 12.

$$DC \cdot X = \frac{DP1 \cdot X + DP2 \cdot X}{2}$$ [Equation 6]

Herein, DC.X represents the coordinate value of the center point of the viewer's face on the X axis $$DC \cdot Y = \frac{DP1 \cdot Y + DP2 \cdot Y}{2}$$ [Equation 7]

Herein, DC.Y represents the coordinate value of the center point of the viewer's face on the Y axis.

$$RPP_{IR} = \frac{\pi}{360} \cdot \theta \cdot IRW$$ [Equation 8]

Herein, RPPIR represents Radians per pixel, and IRW represents the horizontal length of the output of the infrared sensor.

$$Dist = \frac{\left(\frac{FW}{2}\right)}{\tan\left(RPP_{IR} \cdot \frac{DW}{2}\right)}$$ [Equation 9]

Herein, Dist represents the distance (face distance) between the stereoscopic image display 10 and the viewer in FIG. 5.

$$FaceX = \sin\left(RPP_{IR}\left(DC \cdot X - \frac{IRW}{2}\right)\right) \cdot Dist$$ [Equation 10]

Herein, FaceX represents the position of the viewer's face on the X axis in FIG. 5, and DC.X represents the x-axis coordinate value of the viewer's face detected from the output of the infrared sensor.

$$FaceY = \sin\left(RPP_{IR}\left(DC \cdot Y - \frac{IRH}{2}\right)\right) \cdot Dist - \frac{SH}{2}$$ [Equation 11]

Herein, FaceY represents the position of the viewer's face on the Y axis in FIG. 5, and DC.Y represents the y-axis coordinate value of the viewer's face detected from the camera capture image. IRW represents the vertical height of the output of the infrared sensor, and SH represents the vertical height (screen height) of the display screen of the stereoscopic image display 10.

Figure 7:
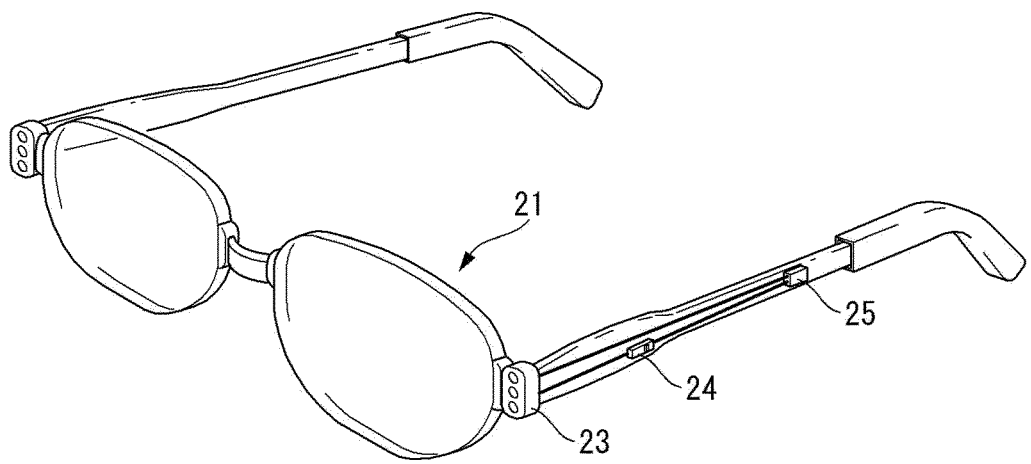
FIG. 7 is a view showing in detail the infrared ray emitting devices of the 3D polarizing glasses shown in FIG. 5.

FIG. 7 is a view showing in detail the infrared ray emitting devices 22L and 22R of the 3D polarizing glasses 21 shown in FIG. 5.

Referring to FIG. 7, each of the infrared light emitting devices 22L and 22R includes an infrared LED module 23, a switching element 24, and a battery 25. The infrared LED module 23 includes one or more infrared LEDs connected in series or parallel. The switching element 24 switches a current path between the infrared LED module 23 and the battery 25 by a viewer manipulation.

Figure 8:
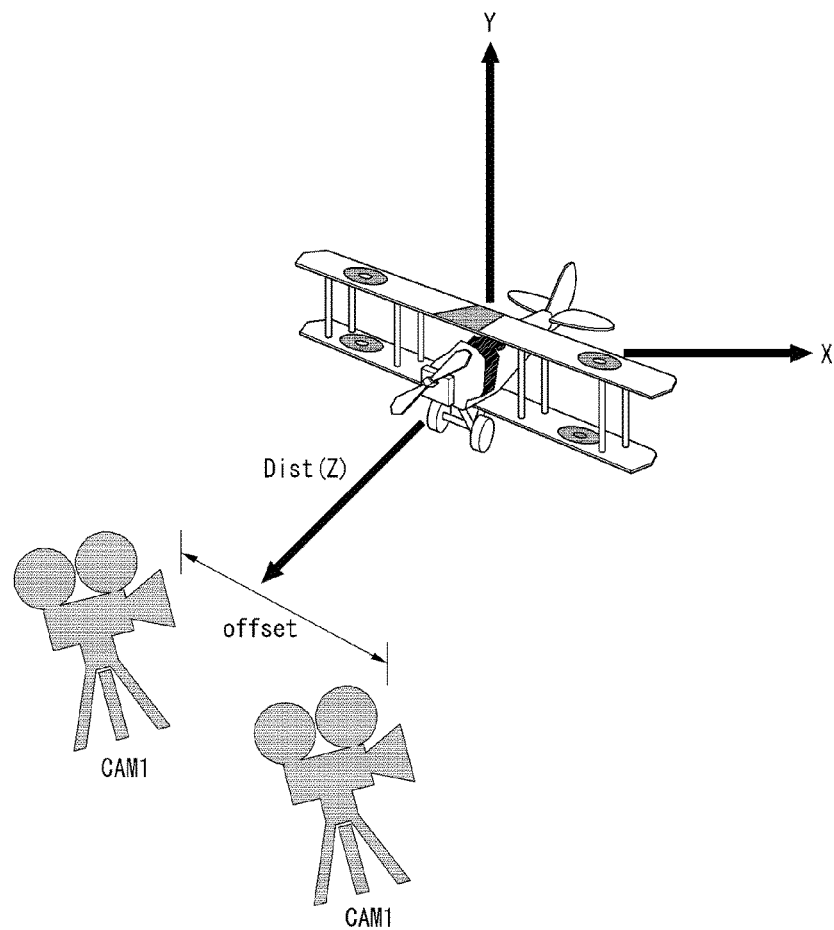
FIG. 8 is a view showing an example in which camera positions generating left-eye and right-eye images are changed in real time in accordance with the three-dimensional position information of the viewer.

Referring to FIG. 8, in the method of controlling a view of a stereoscopic image, as stated above, each of the left-eye and right-eye images is rendered by using the three-dimensional position information of the viewer calculated in steps S1 and S2 as a rendering variable of the left-eye and right-eye images. The stereoscopic image display of the present invention does not store images of all angles of a 3D object, but generates left-eye and right-eye images of the 3D object viewed from left-eye and right-eye camera positions CAM1 and CAM2 spaced apart by the distance (offset) between both eyes of the viewer by using a 3D modeling API (Application Programming Interface), such as OpenGL, Direc3D, etc. In the present invention, the API changes, in real time, the left eye camera position and right-eye camera position which view the same 3D object from a position spaced apart by the distance between both eyes of the viewer, that is, the parameters for determining the viewing angle and depth information of the left-eye and right-eye images in accordance with the three-dimensional position information of the viewer's face calculated in steps S1 and S2.

The stereoscopic image display of the present invention renders each of the left-eye and right-eye images according to the variable parameters which are changed in accordance with the three-dimensional position information of the viewer's face, and then separately displays the left-eye and right-eye images on the stereoscopic image display 10 and changes the viewing angle and depth information of a stereoscopic image. As a result, the stereoscopic image display of the present invention displays a stereoscopic image which can be seen in an unlimited number of views according to the viewer's motion by changing the rendering of the left-eye and right-eye images in real time according to the viewer's motion.

Figure 9:
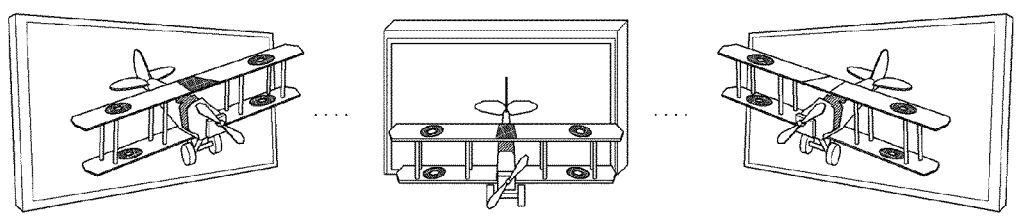
FIG. 9 is a view showing an example in which a view of the stereoscopic image of a 3D object displayed on the stereoscopic image display according to the exemplary embodiment of the present invention is changed in real time.

For example, as shown in FIG. 9, if the viewer moves leftward from the front of the stereoscopic image display 10, the three-dimensional position information of the viewer is changed. Due to this, the left-eye and right-eye images being displayed on the stereoscopic image display 10 are rendered in accordance with the changed three-dimensional position of the viewer, and the viewer can view a 3D object image of which viewing angle and depth information move to the left from the center of FIG. 9, as a stereoscopic image. As shown in FIG. 9, if the viewer moves rightward from the front of the stereoscopic image display 10, the three-dimensional position information of the viewer is changed. Due to this, the left-eye and right-eye images being displayed on the stereoscopic image display 10 are rendered in accordance with the changed three-dimensional position information of the viewer, and the viewer can view a 3D object image of which viewing angle and depth information move to the right from the center of FIG. 9, as a stereoscopic image.

Figure 10A:
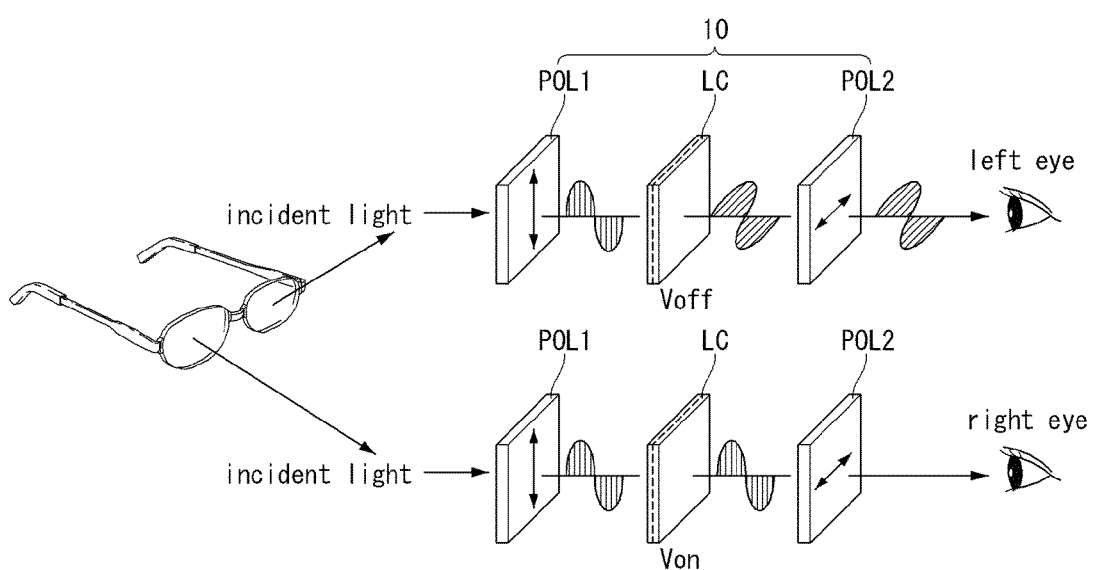
FIGS. 10A to 10D are views showing various implementations of the stereoscopic image display according to the exemplary embodiment of the present invention.

The stereoscopic image display according to the exemplary embodiment of the present invention can be implemented as any stereoscopic image display using a well-known stereoscopic technique or autostereoscopic technique, and changes a view of a stereoscopic image by detecting three-dimensional position information of the viewer in real time and rendering left-eye and right-eye images in real time by using the above-described method of controlling a view of a stereoscopic image. FIGS. 10A and 10D are views showing an example which can be implemented by the stereoscopic image display 10 of the present invention.

The stereoscopic image display 10 shown in FIG. 10A includes polarizing plates POL1 and POL2 in which the optical absorption axes cross each other and a liquid crystal layer LC disposed between the polarizing plates POL1 and POL2. In the stereoscopic image display 10, an electrode for applying an electrical current to the liquid crystal layer LC is formed on a substrate where the polarizing plates POL1 and POL2 are formed. If no voltage Voff is applied to the liquid crystal layer LC, a linear polarized light passing through the first polarizing plate POL1 is changed in the polarization direction while passing through the liquid crystal layer LC having a phase delay value of 90°, and passes through the second polarizing plate POL2. On the other hand, if a predetermined voltage Von is applied to the liquid crystal layer LC, a linear polarized light of the image passing through the first polarizing plate POL1 passes through the liquid crystal layer LC without phase delay and hence cannot pass through the second polarizing plate POL2. By virtue of this, a stereoscopic image can be displayed by controlling the traveling path of the light of the left-eye image and the light of the right-eye image.

Figure 10B:
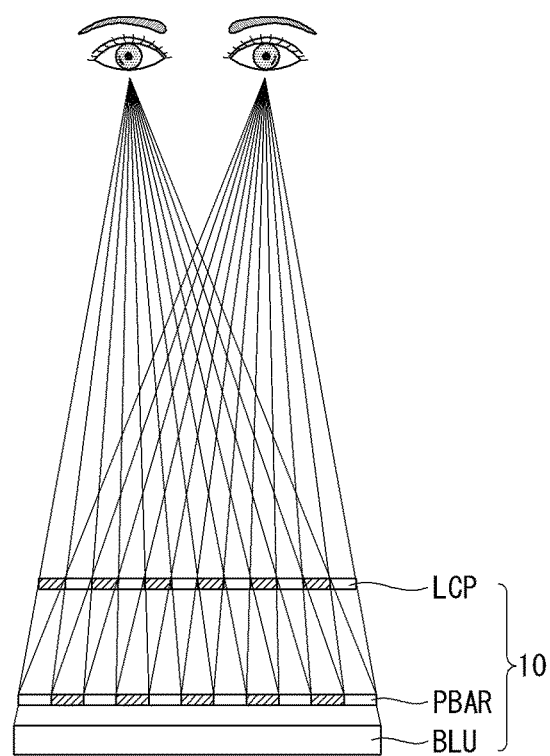

The stereoscopic image display 10 shown in FIG. 10B includes a parallax barrier PBAR disposed between a backlight unit BLU and a liquid crystal display panel LCP. The parallax barrier PBAR separates the traveling path of light passing through the pixels displaying the left-eye image on the liquid crystal display panel LCP and the traveling path of light passing through the pixels displaying the right-eye image thereon.

Figure 10C:
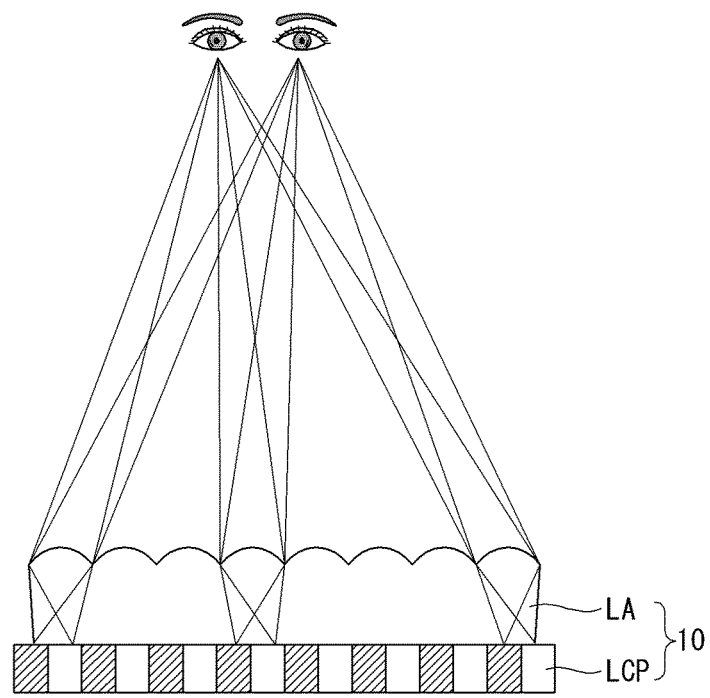
Figure 10D:
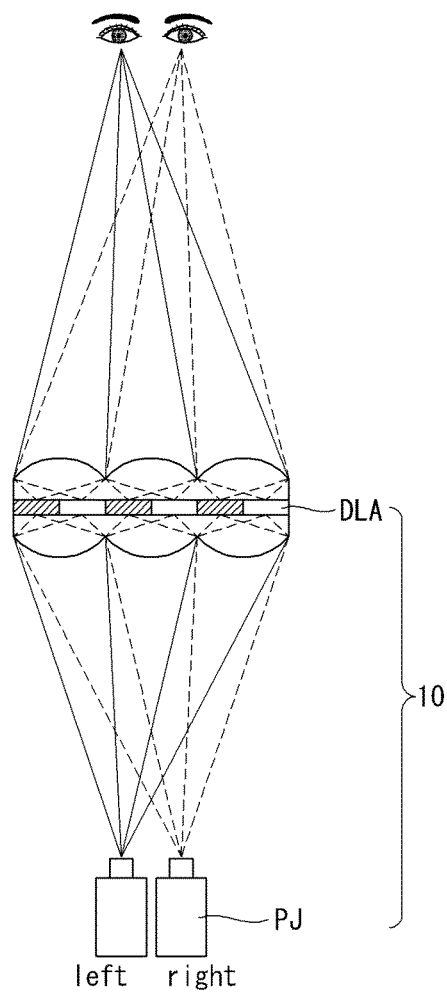

The stereoscopic image display 10 shown in FIG. 10C includes a lenticular lens array LA disposed between a liquid display panel LCP and the viewer. The lenticular lens array separates light of the left-eye image incident from the liquid crystal display panel LCP and light of the right-eye image incident therefrom.

The stereoscopic image display 10 shown in FIG. 10D includes projectors PJ for projecting the left-eye image and the right-eye image, separately, and a double lenticular lens array DLA disposed between the projectors PJ and the viewer. By a combination of the projectors PJ and the double lenticular lens array DLA, the traveling path of light of the left-eye image and the traveling path of light of the right-eye image are separated.

In the stereoscopic image display 10 of these types, an image sensor, such as a camera, or an optical sensor for sensing light of a specific wavelength, such as infrared rays, is installed on a frame at a position from which the viewer is seen in order to detect the viewer's position. In a case where an optical sensor is installed on the stereoscopic image sensor 10, the viewer has to wear light emitting means that emits light of a specific wavelength. The stereoscopic image display 10 includes a position information detecting unit for detecting position information of the viewer's face in accordance with the method of controlling a view of a stereoscopic image and an image processing unit for generating left-eye and right-eye images by adjusting parameters for rendering the left-eye and right-eye images in accordance with the position information. The display device of the stereoscopic image display 10 may be implemented as a field emission display, a plasma display panel, and a display panel of a flat panel display device, including an electroluminescence device EL, such as an inorganic electroluminescence device and an organic light emitting diode OLED, as well as the aforementioned display panel LCP of the liquid crystal display device.

As described above in detail, the method of controlling a view of a stereoscopic image and the stereoscopic image display according to the present invention can provide an unlimited number of views of a stereoscopic image to the viewer by changing the angle and depth information of the stereoscopic image in accordance with the viewer's position.

From the foregoing description, those skilled in the art will readily appreciate that various changes and modifications can be made without departing from the technical idea of the present invention. Therefore, the technical scope of the present invention is not limited to the contents described in the detailed description of the specification but defined by the appended claims.

What is claimed is:

1. A method of controlling a view of a stereoscopic image, the method comprising:
   detecting a position information of a viewer from an output of a sensor;
   changing parameters for rendering a viewing angle and a depth information according to the position information;
   generating a left-eye image and a right-eye image in which a viewing angle and a depth information are changed in accordance with the parameters; and
   displaying the left-eye image and the right-eye image on a stereoscopic image display,
   wherein the detecting of the position information comprises:
      determining whether or not a viewer's position information calculated in a previous frame exists in a current frame, setting a detection range of a face of the viewer to a vicinity of the position information calculated in the previous frame if the position information calculated in the previous frame exists in the current frame, setting the detection range of the face of the viewer to an entire area of the current frame if the position information calculated in the previous frame does not exist in the current frame, and recognizing a region containing color similar to a skin color of the viewer from the output of the sensor as the face of the viewer if the viewer's face is not detected in the detection range, wherein the sensor includes at least one of an image sensor and an optical sensor for sensing light of a specific wavelength, and wherein the sensor senses light received from a pair of light emitting devices, each of the pair of light emitting devices being installed on a respective arm of glasses that the viewer wears.

2. The method of claim 1, wherein the detecting of the position information comprises detecting the position information by calculating three-dimensional position information for a face of the viewer based on the output of the sensor.

3. The method of claim 2, wherein the changing of the parameters comprises changing the parameters in accordance with the three-dimensional position information of the face of the viewer.

4. The method of claim 1, wherein the generating of the left-eye image and the right-eye image comprises generating the left-eye image and the right-eye image while changing positions of a left-eye camera and a right-eye camera, which view a same 3D (three-dimensional) object at a position spaced apart by a distance between both eyes of the viewer, in accordance with the parameters.

5. The method of claim 1, wherein:
the pair of light emitting devices comprises a first light emitting device and a second light emitting device; and
a width between the first and second light emitting devices is calculated according to the following equation:

$$DW = \sqrt{(DP1.X - DP2.X)^2 + (DP1.Y - DP2.Y)^2},$$

where DW is the width between the first and second light emitting devices, DP1.X is an x-axis position of the first light emitting device, DP2.X is an x-axis position of the second light emitting device, DP1.Y is a y-axis position of the first light emitting device, and DP2.Y is a y-axis position of the second light emitting device.

6. The method of claim 5, wherein:
a coordinate value of a center point of the face of the viewer on the x-axis is calculated according to the following equation:

$$DC.X = \frac{DP1.X + DP2.X}{2};$$

and
a coordinate value of a center point of the face of the viewer on the y-axis is calculated according to the following equation:

$$DC.Y = \frac{DP1.Y + DP2.Y}{2},$$

where DC.X is coordinate value of a center point of the face of the viewer on the x-axis, and DC.Y is coordinate value of a center point of the face of the viewer on the y-axis.

7. The method of claim 6, wherein a distance of the face of the viewer from the stereoscopic image display is calculated according to the following equations:

$$RPP_{IR} = \frac{\pi}{360} \cdot \theta \cdot IRW$$

$$Dist = \frac{\left(\frac{FW}{2}\right)}{\tan\left(RPP_{IR} \cdot \frac{DW}{2}\right)},$$

where $RPP_{IR}$ represents Radians per pixel, IRW represents a horizontal length of an output of the sensor, Dist represents the distance of the face of the viewer from the stereoscopic image display, $\theta$ is an angle from which the viewer views the stereoscopic image, and FW is a width of the face of the viewer.

8. The method of claim 7, wherein:
a position of the face of the viewer face on the x-axis is calculated according to the following equation:

$$FaceX = \sin\left(RPP_{IR}\left(DC.X - \frac{IRW}{2}\right)\right) \cdot Dist;$$

and
a position of the face of the viewer face on the y-axis is calculated according to the following equation:

$$FaceY = \sin\left(RPP_{IR}\left(DC.Y - \frac{IRH}{2}\right)\right) \cdot Dist - \frac{SH}{2},$$

where FaceX is the position of the face of the viewer face on the x-axis, FaceY is the position of the face of the viewer face on the y-axis, IRH represents a vertical height of the output of the sensor, and SH represents a vertical height of a display screen of the stereoscopic image display.

9. A stereoscopic image display, comprising:
a display device including a sensor, the sensor comprising at least one of an image sensor and an optical sensor for sensing light of a specific wavelength;
a position information detecting unit for detecting a position information of a viewer based on an output of the sensor;
an image processing unit for generating a left-eye image and a right-eye image in which a viewing angle and a depth information are changed by changing parameters for rendering a viewing angle and a depth information in accordance with the position information, and for separately displaying the left-eye and right-eye images on the stereoscopic image display; and
glasses on which a respective light emitting device is installed on each arm of the glasses, the light emitting devices being configured to emit light having a specific wavelength, the sensor configured to sense light received from the light emitting devices, the glasses being configured to be worn by the viewer,
wherein the position information detecting unit is configured to:
determine whether or not a viewer's position information calculated in a previous frame exists in a current frame,
set a detection range of a face of the viewer to a vicinity of the position information calculated in the previous frame if the position information calculated in the previous frame exists in the current frame, set the detection range of the face of the viewer to an entire area of the current frame if the position information calculated in the previous frame does not exist in the current frame, and recognize a region containing color similar to a skin color of the viewer from the output of the sensor as the face of the viewer if the viewer's face is not detected in the detection range.

10. The stereoscopic image display of claim 9, wherein the viewer position information detecting unit detects the viewer position information by calculating three-dimensional position information for a face of the viewer based on the output of the sensor.

11. The stereoscopic image display of claim 10, wherein the image processing unit changes the parameters in accordance with the three-dimensional position information of the viewer's face.

12. The stereoscopic image display of claim 9, wherein the image processing unit generates the left-eye image and the right-eye image while changing positions of a left-eye camera and a right-eye camera, which view a same 3D (three-dimensional) object at a position spaced apart by the distance between both eyes of the viewer, in accordance with the parameters.

13. The method of claim 9, wherein:
the pair of light emitting devices comprises a first light emitting device and a second light emitting device; and
a width between the first and second light emitting devices is represented by the following equation:

$$DW = \sqrt{(DP1.X - DP2.X)^2 + (DP1.Y - DP2.Y)^2},$$

where DW is the width between the first and second light emitting devices, DP1.X is an x-axis position of the first light emitting device, DP2.X is an x-axis position of the second light emitting device, DP1.Y is a y-axis position of the first light emitting device, and DP2.Y is a y-axis position of the second light emitting device.

14. The method of claim 13, wherein:
a coordinate value of a center point of the face of the viewer on the x-axis is represented by the following equation:

$$DC.X = \frac{DP1.X + DP2.X}{2};$$

and
a coordinate value of a center point of the face of the viewer on the y-axis is represented by the following equation:

$$DC.Y = \frac{DP1.Y + DP2.Y}{2},$$

where DC.X is coordinate value of a center point of the face of the viewer on the x-axis, and DC.Y is coordinate value of a center point of the face of the viewer on the y-axis.

15. The method of claim 14, wherein a distance of the face of the viewer from the stereoscopic image display is represented by the following equations:

$$RPP_{IR} = \frac{\pi}{360} \cdot \theta \cdot IRW$$

$$Dist = \frac{\left(\frac{FW}{2}\right)}{\tan\left(RPP_{IR} \cdot \frac{DW}{2}\right)},$$

where $RPP_{IR}$ represents Radians per pixel, IRW represents a horizontal length of an output of the sensor, Dist represents the distance of the face of the viewer from the stereoscopic image display, $\theta$ is an angle from which the viewer views the stereoscopic image, and FW is a width of the face of the viewer.

16. The method of claim 15, wherein:
a position of the face of the viewer face on the x-axis is represented by the following equation:

$$FaceX = \sin\left(RPP_{IR}\left(DC.X - \frac{IRW}{2}\right)\right) \cdot Dist;$$

and
a position of the face of the viewer face on the y-axis is represented by the following equation:

$$FaceY = \sin\left(RPP_{IR}\left(DC.Y - \frac{IRH}{2}\right)\right) \cdot Dist - \frac{SH}{2},$$

where FaceX is the position of the face of the viewer face on the x-axis, FaceY is the position of the face of the viewer face on the y-axis, IRH represents a vertical height of the output of the sensor, and SH represents a vertical height of a display screen of the stereoscopic image display.

* * * * *